US012739772B2

(12) United States Patent
Butt et al.

(10) Patent No.: US 12,739,772 B2
(45) Date of Patent: Sep. 15, 2026

(54) ATTACHMENT PROCEDURE FOR PASSIVE IOT DEVICE COMMUNICATION WITH AMBIENT ENERGY SOURCE

(71) Applicant: Nokia Technologies Oy, Espoo (FI)

(72) Inventors: Muhammad Majid Butt, Naperville, IL (US); Ahlem Khlass, Massy (FR); Rapeepat Ratasuk, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 383 days.

(21) Appl. No.: 18/484,123

(22) Filed: Oct. 10, 2023

(65) Prior Publication Data

US 2024/0129875 A1 Apr. 18, 2024

Related U.S. Application Data

(60) Provisional application No. 63/417,096, filed on Oct. 18, 2022.

(51) Int. Cl.
*H04W 60/00* (2009.01)

(52) U.S. Cl.
CPC .................................. *H04W 60/00* (2013.01)

(58) Field of Classification Search
None
See application file for complete search history.

(56) References Cited

U.S. PATENT DOCUMENTS 10,719,674 B2 7/2020 Fischer
10,931,135 B2 2/2021 Lazaro et al.
2009/0161589 A1 6/2009 Twitchell, Jr.
2019/0356173 A1 11/2019 Forster
2020/0403459 A1 12/2020 Chowdhury et al.

(Continued)

FOREIGN PATENT DOCUMENTS

KR 20210085191 A 7/2021
WO 2001/006401 A1 1/2001
WO 2019/158187 A1 8/2019

OTHER PUBLICATIONS

"Moderator's summary of Discussion [RAN94e-R18Prep-28] Passive IoT", 3GPP TSG RAN#94e, RP-212688, Agenda: 8A.5, Ericsson, Dec. 6-17, 2021, pp. 1-45.

(Continued)

*Primary Examiner* — Idowu O Osifade
(74) *Attorney, Agent, or Firm* — Robert P. Michal, Esq.; Rimon PC

(57) ABSTRACT

In a system, apparatus, method, and non-transitory computer readable medium related to attachment procedures for passive Internet of Things (IoT) device communication with ambient energy sources, wherein a radio access network (RAN) node is caused to, receive an association request message transmitted by an energy-harvesting (EH) user equipment (UE) device based on an energy level of the EH UE device, assign a reader node from a plurality of reader nodes to the EH UE device based on the association request message, transmit an association response message to the EH UE device and the assigned reader node, the association response message including attachment information associated with the EH UE device and the assigned reader node, and receive an attachment acknowledgement message from the assigned reader node in response to the association response message.

20 Claims, 5 Drawing Sheets

(56) References Cited

U.S. PATENT DOCUMENTS

| | | | | |
|---|---|---|---|---|
| 2023/0261729 | A1* | 8/2023 | Huang | H04B 7/0857 375/267 |
| 2024/0230825 | A9* | 7/2024 | Duan | H04B 7/04013 |
| 2025/0008490 | A1* | 1/2025 | Elshafie | H04L 5/0053 |
| 2025/0142505 | A1* | 5/2025 | Li | H04W 56/004 |
| 2025/0159706 | A1* | 5/2025 | Kazmi | H04L 5/001 |
| 2025/0202534 | A1* | 6/2025 | Elshafie | H04B 5/45 |

OTHER PUBLICATIONS

"Discussion on Passive IoT for 5G-Advanced", 3GPP TSG RAN Meeting #96, RP-221268, Agenda: 9.1, vivo, Jun. 6-9, 2022, 6 pages.
Iqbal et al., "GWINs: Group-Based Medium Access for Large-Scale Wireless Powered IoT Networks", IEEE Access, vol. 7, Nov. 26, 2019, pp. 172913-172927.
Extended European Search Report received for corresponding European Patent Application No. 23203361.3, dated Feb. 20, 2024, 12 pages.
Mohanti et al., "WiFED: WiFi Friendly Energy Delivery with Distributed Beamforming", IEEE INFOCOM 2018—IEEE Conference on Computer Communications, Apr. 16-19, 2018, pp. 926-934.
Huang et al., "Energy sharing within EH-enabled wireless communication networks", IEEE Wireless Communications, vol. 22, No. 03, Jun. 2015, pp. 144-149.

* cited by examiner

ATTACHMENT PROCEDURE FOR PASSIVE IOT DEVICE COMMUNICATION WITH AMBIENT ENERGY SOURCE

BACKGROUND

Field

Various example embodiments relate to methods, apparatuses, systems, and/or non-transitory computer readable media for providing attachment procedures for passive Internet of Things (IoT) device communication, the passive IoT device configured to collect energy from at least one ambient energy source.

Description of the Related Art

The 3rd Generation Partnership Project (3GPP) 5$^{th}$ generation mobile network (5G) standard, referred to as 5G New Radio (NR), is being developed to provide higher capacity, higher reliability, and lower latency communications than the 4G long term evolution (LTE) standard.

There have been proposals to extend the 5G NR standard to provide communication support for passive IoT devices which may have reduced processing, memory, and/or energy capabilities in comparison to active IoT devices and/or standard user equipment (UE) devices, such as mobile phones, smartphones, etc. Passive IoT devices (and/or passive UE devices) are devices which are incapable of initiating communication with the 3GPP network (e.g., device initiated attachment to the network, etc.) by transmitting data to a base station of the network, etc., and instead, the network must initiate communication (e.g., network initiated attachment with the device, etc.) with the IoT device. Passive IoT devices may include wireless tags, industrial wireless sensors, video surveillance devices, and/or wearable smart devices, etc. Passive IoT devices may operate in extreme environmental conditions, e.g., high pressure environments, extreme temperatures, high humidity environments, be subject to constant motion and/or vibrations, etc. Additionally, passive IoT devices may have ultra-low complexity (e.g., to facilitate low cost), small physical sizes and/or small form factors, may desire and/or require maintenance-free operation (e.g., without human intervention), and/or may desire and/or require longer device life cycles, etc. Moreover, the passive IoT device may have limited on-device energy storage capacity and/or may be a battery-less IoT device, etc.

Accordingly, some passive IoT devices may include, may be used with, and/or may be connected to energy harvesting (EH) devices, such as solar panels, wind turbines, heat capture devices, radio frequency (RF) energy harvesting devices, kinetic energy harvesting devices, etc., which may collect energy for storage in a low-capacity power storage device included in the passive IoT device and/or may power the operation of a battery-less passive IoT device.

SUMMARY

At least one example embodiment relates to a radio access network (RAN) node.

In at least one example embodiment, the node may include a memory storing computer readable instructions, and processing circuitry configured to execute the computer readable instructions to cause the node to, receive an association request message transmitted by an energy-harvesting (EH) user equipment (UE) device based on an energy level of the EH UE device, assign a reader node from a plurality of reader nodes to the EH UE device based on the association request message, transmit an association response message to the EH UE device and the assigned reader node, the association response message including attachment information associated with the EH UE device and the assigned reader node, and receive an attachment acknowledgement message from the assigned reader node in response to the association response message.

Some example embodiments provide that the association request message further includes signal to interference and noise ratio (SINR) information of at least one reader node of the plurality of reader nodes measured by the EH UE device in response to a signal transmitted by the at least one reader node, and the node is further caused to assign the reader node by, selecting the assigned reader node from the plurality of reader nodes based on the received SINR information.

Some example embodiments provide that the association request message includes an identifier associated with the EH UE device, and the node is further caused to assign the reader node to the EH UE device by, selecting the assigned reader node from the plurality of reader nodes based on the identifier associated with the EH UE device.

Some example embodiments provide that the node is further caused to assign the reader node by, determining an approximate location of the EH UE device based on the identifier associated with the EH UE device, and selecting the assigned reader node from the plurality of reader nodes based on a determined distance between the approximate location of the EH UE device and locations of the plurality of reader nodes.

Some example embodiments provide that the node is further caused to, receive a message from each of the plurality of reader nodes in response to the transmitted association request message, the messages including SINR information between the EH UE device and the respective reader node, and the node is further caused to assign the reader node by, selecting the assigned reader node from the plurality of reader nodes based on the received SINR information measured between the EH UE device and the plurality of reader nodes.

Some example embodiments provide that the attachment information includes at least one of: random access configuration associated with the assigned reader node, an identifier associated with the assigned reader node, the identifier associated with the EH UE device, or any combinations thereof.

Some example embodiments provide that the attachment information includes attachment timer information, a first stored energy threshold, and a second stored energy threshold, the first stored energy threshold associated with transmission between the EH UE device and the assigned reader node, and the second stored energy threshold associated with transmission between the EH UE device and the RAN node.

Some example embodiments provide that the node is further caused to, receive data transmitted by the EH UE device in response to expiration of a configured time period corresponding to the attachment timer information and the energy level of the EH UE device exceeding the second stored energy threshold, assign a new reader node from the plurality of reader nodes to the EH UE device in response to the received data, and transmit a new association response message to the EH UE device and the new assigned reader node, the new association response message including new attachment information associated with the EH UE device and the new assigned reader node.

At least one example embodiment relates to an energy-harvesting (EH) user equipment (UE) device.

In at least one example embodiment, the device may include at least one energy harvesting circuitry configured to collect energy, a memory storing computer readable instructions, and processing circuitry configured to execute the computer readable instructions to cause the device to, transmit an association request message to a radio access network (RAN) node based on an energy level of the collected energy, receive an association response message from the RAN node, the association response message including attachment information corresponding to a reader node assigned to the EH UE device from a plurality of reader nodes, and transmit data to the assigned reader node based on the attachment information.

Some example embodiments provide that the device is further caused to, receive a signal from at least one reader node of the plurality of reader nodes, measure signal to interference and noise ratio (SINR) information between the at least one reader node and the EH UE device using the received signal, and transmit the association request message to the RAN node, the association request message further including the measured SINR information.

Some example embodiments provide that the reader node is assigned by the RAN node from the plurality of reader nodes based on a determined distance between an approximate location of the EH UE device determined based on the identifier associated with the EH UE device and locations of the plurality of reader nodes.

Some example embodiments provide that the reader node is assigned to the EH UE device by the RAN node from the plurality of reader nodes based on a measured SINR between the EH UE device and the plurality of reader nodes.

Some example embodiments provide that the attachment information includes at least one of: random access configuration associated with the assigned reader node, an identifier associated with the assigned reader node, the identifier associated with the EH UE device, or any combinations thereof.

Some example embodiments provide that the at least one energy harvesting circuitry is configured to collect the energy from at least one of: ambient radio frequency energy, kinetic energy, solar energy, thermal energy, or any combinations thereof.

At least one example embodiment relates to a method of operating a radio access network (RAN) node.

In at least one example embodiment, the method may include, receiving an association request message transmitted by an energy-harvesting (EH) user equipment (UE) device based on an energy level of the EH UE device, assigning a reader node from a plurality of reader nodes to the EH UE device based on the association request message, transmitting an association response message to the EH UE device and the assigned reader node, the association response message including attachment information associated with the EH UE device and the assigned reader node, and receiving an attachment acknowledgement message from the assigned reader node in response to the association response message.

Some example embodiments provide that the association request message includes an identifier associated with the EH UE device, and the assigning the reader node further includes selecting the assigned reader node from the plurality of reader nodes based on the identifier associated with the EH UE device.

Some example embodiments provide that the assigning the reader node further includes, determining an approximate location of the EH UE device based on the identifier associated with the EH UE device, and selecting the assigned reader node from the plurality of reader nodes based on a determined distance between the approximate location of the EH UE device and locations of the plurality of reader nodes.

Some example embodiments provide that the method may further include, receiving a message from each of the plurality of reader nodes in response to the transmitted association request message, the messages including signal to interference and noise ratio (SINR) information between the EH UE device and the respective reader node, and the assigning the reader node further includes, selecting the assigned reader node from the plurality of reader nodes based on the received SINR information measured between the EH UE device and the plurality of reader nodes.

Some example embodiments provide that the attachment information includes attachment timer information, and the attachment information includes at least one of: random access configuration associated with the assigned reader node, an identifier associated with the assigned reader node, the identifier associated with the EH UE device, or any combinations thereof.

Some example embodiments provide that the method may further include, receiving data transmitted by the EH UE device in response to expiration of a configured time period corresponding to the attachment timer information, assigning a new reader node from the plurality of reader nodes to the EH UE device based on the received data, and transmitting a new association response message to the EH UE device and the new assigned reader node, the new association response message including attachment information associated with the EH UE device and the new assigned reader node.

At least one example embodiment relates to a radio access network (RAN) node.

In at least one example embodiment, the node may include means for, receiving an association request message transmitted by an energy-harvesting (EH) user equipment (UE) device based on an energy level of the EH UE device, assigning a reader node from a plurality of reader nodes to the EH UE device based on the association request message, transmitting an association response message to the EH UE device and the assigned reader node, the association response message including attachment information associated with the EH UE device and the assigned reader node, and receiving an attachment acknowledgement message from the assigned reader node in response to the association response message.

Some example embodiments provide that the association request message further includes signal to interference and noise ratio (SINR) information of at least one reader node of the plurality of reader nodes measured by the EH UE device in response to a signal transmitted by the at least one reader node, and the node further includes means for, selecting the assigned reader node from the plurality of reader nodes based on the received SINR information.

Some example embodiments provide that the association request message includes an identifier associated with the EH UE device, and the node further includes means for, selecting the assigned reader node from the plurality of reader nodes based on the identifier associated with the EH UE device.

Some example embodiments provide that the node further includes means for, determining an approximate location of the EH UE device based on the identifier associated with the EH UE device, and selecting the assigned reader node from the plurality of reader nodes based on a determined distance between the approximate location of the EH UE device and locations of the plurality of reader nodes.

Some example embodiments provide that the node further includes means for, receiving a message from each of the plurality of reader nodes in response to the transmitted association request message, the messages including SINR information between the EH UE device and the respective reader node, and selecting the assigned reader node from the plurality of reader nodes based on the received SINR information measured between the EH UE device and the plurality of reader nodes.

Some example embodiments provide that the attachment information includes at least one of: random access configuration associated with the assigned reader node, an identifier associated with the assigned reader node, the identifier associated with the EH UE device, or any combinations thereof.

Some example embodiments provide that the attachment information includes attachment timer information, a first stored energy threshold, and a second stored energy threshold, the first stored energy threshold associated with transmission between the EH UE device and the assigned reader node, and the second stored energy threshold associated with transmission between the EH UE device and the RAN node.

Some example embodiments provide that the node further includes means for, receiving data transmitted by the EH UE device in response to expiration of a configured time period corresponding to the attachment timer information and the energy level of the EH UE device exceeding the second stored energy threshold, assigning a new reader node from the plurality of reader nodes to the EH UE device in response to the received data, and transmitting a new association response message to the EH UE device and the new assigned reader node, the new association response message including new attachment information associated with the EH UE device and the new assigned reader node.

At least one example embodiment relates to an energy-harvesting (EH) user equipment (UE) device.

In at least one example embodiment, the device may include means for, collecting energy, transmitting an association request message to a radio access network (RAN) node based on an energy level of the collected energy, receiving an association response message from the RAN node, the association response message including attachment information corresponding to a reader node assigned to the EH UE device from a plurality of reader nodes, and transmitting data to the assigned reader node based on the attachment information.

Some example embodiments provide that the device may include means for, receiving a signal from at least one reader node of the plurality of reader nodes, measuring signal to interference and noise ratio (SINR) information between the at least one reader node and the EH UE device using the received signal, and transmitting the association request message to the RAN node, the association request message further including the measured SINR information.

Some example embodiments provide that the reader node is assigned by the RAN node from the plurality of reader nodes based on a determined distance between an approximate location of the EH UE device determined based on the identifier associated with the EH UE device and locations of the plurality of reader nodes.

Some example embodiments provide that the reader node is assigned to the EH UE device by the RAN node from the plurality of reader nodes based on a measured SINR between the EH UE device and the plurality of reader nodes.

Some example embodiments provide that the attachment information includes at least one of: random access configuration associated with the assigned reader node, an identifier associated with the assigned reader node, the identifier associated with the EH UE device, or any combinations thereof.

Some example embodiments provide that the device further includes means for collecting the energy from at least one of: ambient radio frequency energy, kinetic energy, solar energy, thermal energy, or any combinations thereof.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
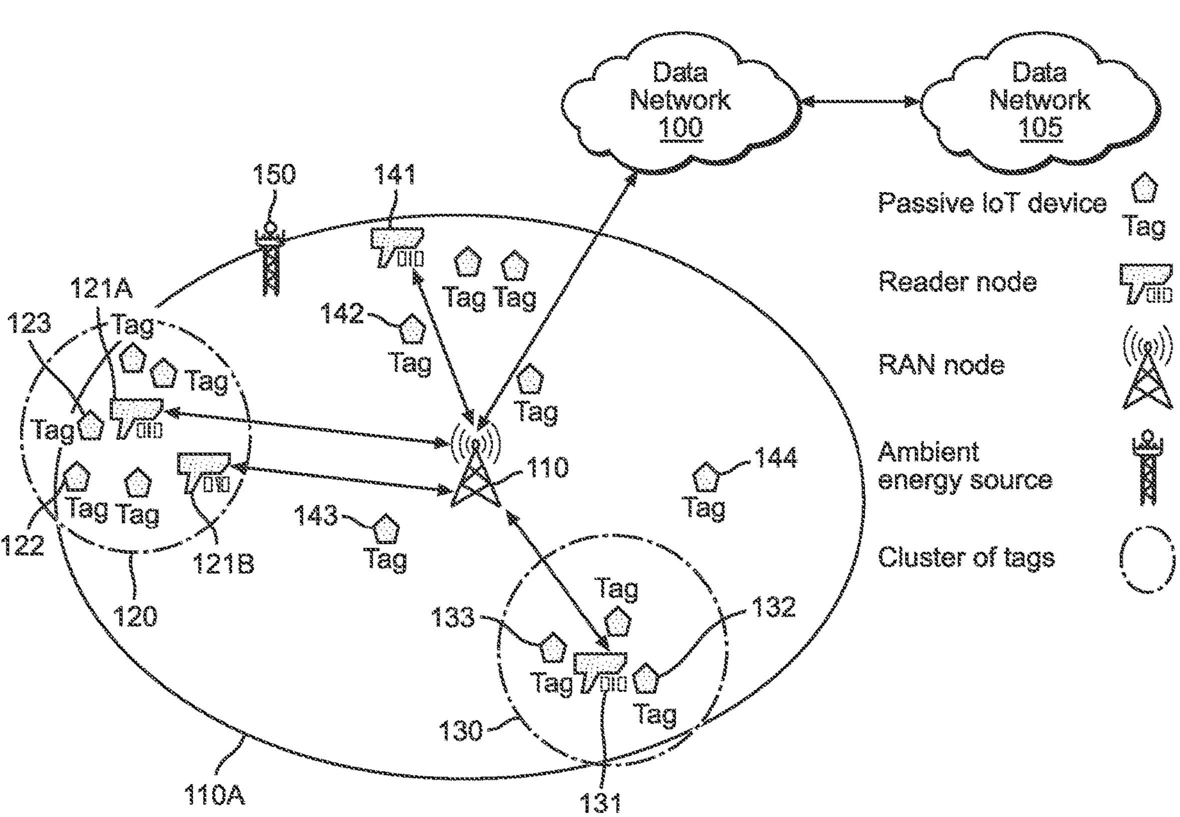
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

Various example embodiments are directed towards network attachment procedures to accommodate energy harvesting (EH) passive IoT devices, e.g., EH UE devices, EH tag devices, EH passive UE devices, etc. Because EH passive IoT devices are not connected to a reliable power source, the ability of the EH passive IoT device to receive paging from a radio access network (RAN) node (e.g., a base station, etc.) of the wireless network is unpredictable and/or unreliable, and most importantly, out of the control of the wireless network. The various example embodiments improve the ability of EH passive IoT devices to transmit data to radio access network (RAN) nodes by having the RAN node discover the passive IoT devices first, and then attaching the passive IoT devices to physically near reader nodes, or reader nodes with a good radio link to the passive IoT devices, that are associated with the wireless network, based on the energy levels (e.g., collected energy levels, stored energy levels, available energy levels, etc.) of the EH passive IoT devices, etc., and/or measured signal quality metrics between the EH passive IoT device and the reader nodes, thereby decreasing the energy consumed and/or required to be consumed to transmit data from the EH passive IoT device to the wireless network. Additionally, reader nodes may experience improved energy efficiency because the reader nodes will not continuously monitor for data transmitted by the EH passive IoT devices, and instead will monitor for data dynamically and/or at the control of the wireless network, etc. Accordingly, the reliability of data transmission between passive IoT devices and the wireless network is improved and the energy efficiency of the passive IoT device, reader nodes, and/or the RAN node is improved and/or optimized, but the example embodiments are not limited thereto.

FIG. 1 illustrates a wireless communication system according to at least one example embodiment. As shown in FIG. 1, a wireless communication system includes a core network 100, a Data Network 105, a radio access network (RAN) node 110, a first geographical area 120, a second geographical area 130, and/or an ambient energy source 150, etc., but the example embodiments are not limited thereto. Additionally, the wireless communication systems may include a plurality of passive IoT devices (hereinafter referred to as EH UE devices), e.g., EH UE devices 122, 132, 142, 143, 144, etc., a plurality of reader nodes, e.g., reader nodes (e.g., a receiver, a relay node, a tag receiver, a tag reader node, etc.) 121A, 121B, 131, 141, etc., but the example embodiments are not limited thereto. However, the example embodiments are not limited thereto and the example embodiments may include a greater or lesser number of constituent elements, such as two or more RAN nodes, a single EH UE device, a single reader node, one or more active IoT devices, one or more active UE devices, additional base stations, servers, routers, access points, gateways, etc.

The RAN node 110, the reader nodes 121A, 121B, 131, 141, etc., and/or the EH UE devices 122, 132, 142, 143, 144, etc., may be connected over a wireless network, such as a cellular wireless access network (e.g., a 3G wireless access network, a 4G-Long Term Evolution (LTE) network, a 5G-New Radio (e.g., 5G) wireless network, a 6G wireless network, a WiFi network, etc.). The wireless network may include a core network 100 and/or a Data Network 105. The RAN node 110 may connect to other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

The reader nodes 121A, 121B, 131, 141, etc., may be any one of, but not limited to, a stationary wireless reader device, a mobile wireless reader device, a tag reader node, an access point, a router, a microcell, a picocell, and/or any other active wireless node capable of attaching to the RAN node 110. For example, in some example embodiments, the reader node may be a mobile phone, a smartphone, a tablet, a laptop computer, a server, a wearable device, an active Internet of Things (IoT) device, a desktop computer and/or any other type of stationary or portable device capable of operating according to, for example, the 5G NR communication standard, and/or other wireless communication standard(s). The reader nodes 121A, 121B, 131, 141, etc., may be configurable to transmit and/or receive data in accordance to strict latency, reliability, and/or accuracy requirements, such as DRX communications, URLLC communications, TSC communications, etc., but the example embodiments are not limited thereto.

According to at least one example embodiment, the EH UE devices 122, 132, 142, 143, 144, etc., may be energy harvesting passive IoT devices, energy harvesting passive UE devices (and/or EH REDCAP UE devices, etc.), etc., and may be configured to harvest energy using EH circuitry (e.g., EH devices, EH apparatuses, and/or EH means, etc.), such as solar cells/panels, wind turbines, water turbines, heat pumps, geothermal heat pumps, kinetic energy harvesting devices and/or vibration harvesting devices, ambient radio frequency (RF) harvesting devices (e.g., back-scattering circuitry configured to energy harvest RF signals transmitted by non-3GPP RF sources and/or non-desired RAT RF sources, such as RF signals transmitted by television broadcast towers, radio broadcast towers, WiFi base stations, etc.), but the example embodiments are not limited thereto. According to some example embodiments, the EH UE device may be a wireless tag, a sensor (e.g., thermometers, humidity sensors, pressure sensors, motion sensors, accelerometers, etc.), medical devices, actuators, robotic devices, robotics, drones, connected medical devices, eHealth devices, smart city related devices, smart grid devices, security cameras, autonomous devices (e.g., autonomous unmanned aerial vehicles, etc.), etc., but the example embodiments are not limited thereto.

According to at least one example embodiment, the EH UE devices 122, 132, 142, 143, 144, etc., may harvest (e.g., obtain, collect, etc.) energy from the at least one EH harvesting circuitry included in, connected to, and/or attached to the EH UE device, and the EH UE devices 122, 132, 142, 143, 144, etc., may store the harvested energy in at least one energy storage device (e.g., a battery, a capacitor, etc.) included in, connected to, and/or associated with the UE device, etc., but the example embodiments are not limited thereto. Additionally, according to some example embodiments, one or more of the EH UE devices 122, 132, 142, 143, 144, etc., may omit the energy storage device, and may be powered directly by the energy collected by the EH harvesting device, etc.

The wireless communication system further includes at least one RAN node (e.g., a base station, a wireless access point, etc.), such as RAN node 110, etc. The RAN node 110, etc., may operate according to an underlying cellular and/or wireless radio access technology (RAT), such as 5G NR, LTE, Wi-Fi, etc. For example, the RAN node 110 may be a 5G gNB node, an LTE eNB node, or an LTE ng-eNB node, etc., but the example embodiments are not limited thereto. The RAN node 110 may provide wireless network services to one or more EH UE devices, reader nodes, and/or other UE devices within one or more cells (e.g., cell service areas, broadcast areas, serving areas, coverage areas, etc.) surrounding the respective physical location of the RAN node, such as a cell 110A surrounding the RAN node 110, etc. While FIG. 1 illustrates a single cell for the RAN node 110, the example embodiments are not limited thereto, and for example, the RAN node may provide a plurality of cells, etc.

For example, reader nodes 121A, 121B, 131, 141, etc., are located within the cell service area 110A, and may connect to, receive broadcast messages from, receive paging messages from, receive/transmit signaling messages from/to, and/or access the wireless network through, etc., RAN node 110, but the example embodiments are not limited thereto.

According to some example embodiments, certain, desired, and/or geographical locations, such as areas 120 and 130, etc., may include a plurality of EH UE devices and at least one reader node, such as a factory, a warehouse, a medical facility, an office building, etc., and the geographical location may be known to the wireless network (e.g., the RAN node 110, etc.). According to at least one example embodiment, an identifier associated with each of the EH UE devices and/or reader nodes may indicate and/or be associated with the geographical area the EH UE device and/or reader node resides and/or is located within, but the example embodiments are not limited thereto. Further, according to some example embodiments, one or more EH UE devices, such as EH UE devices 142, 143, 144, etc., and/or reader node 141 may not be associated with a geographical location, etc.

According to at least one example embodiment, the RAN node 110 may receive messages from one or more of the EH UE devices 122, 132, 142, 143, 144, etc., and then may assign and/or associate the one or more EH UE devices to at least one reader node 121A, 121B, 131, 141, etc., based on current physical conditions and/or current network conditions. The reader node(s) may then receive data from the associated EH UE device, and forward and/or transmit the received data to the RAN node 110, but the example embodiments are not limited thereto. The attachment procedure will be discussed in further detail in connection with FIGS. 4 to 7.

Additionally, the RAN node 110 may be configured to operate in a multi-user (MU) multiple input multiple out (MIMO) mode and/or a massive MIMO (mMIMO) mode, wherein the RAN node 110 transmits a plurality of beams (e.g., radio channels, datastreams, streams, etc.) in different spatial domains and/or frequency domains using a plurality of antennas (e.g., antenna panels, antenna elements, an antenna array, etc.) and beamforming and/or beamsteering techniques.

The RAN node 110 may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., and/or equivalent functions, but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system, such as access points, switches, routers, nodes, servers, gateways, etc.

Figure 2:
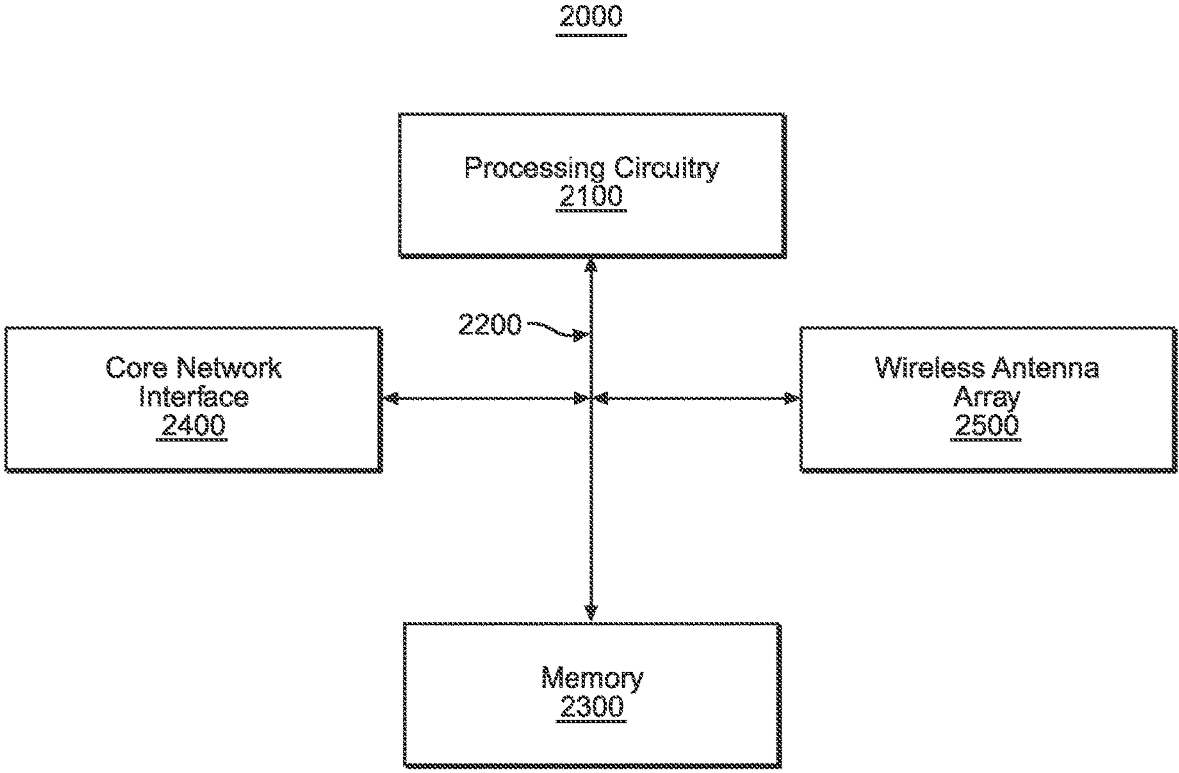
FIG. 2 illustrates a block diagram of an example RAN node and/or example reader node according to at least one example embodiment.

FIG. 2 illustrates a block diagram of an example RAN node and/or example IoT reader node according to at least one example embodiment. The node of FIG. 2 may correspond to the RAN node 110 and/or reader nodes 121A, 121B, 131, 141, of FIG. 1, but the example embodiments are not limited thereto.

Referring to FIG. 2, a node 2000 may include processing circuitry, such as at least one processor 2100, at least one communication bus 2200, a memory 2300, at least one core network interface 2400, and/or at least one wireless antenna array 2500, etc., but the example embodiments are not limited thereto. For example, the core network interface 2400 and the wireless antenna array 2500 may be combined into a single network interface, etc., or the node 2000 may include a plurality of wireless antenna arrays, a plurality of core network interfaces, etc., and/or any combinations thereof. The memory 2300 may include various special purpose program code including computer executable instructions which may cause the node 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the node 2000, and thereby cause the node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire node 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the node 2000, such as the methods discussed in connection with FIGS. 4 to 7, the at least one core network interface 2400, and/or at least one wireless antenna array 2500, etc. Such software elements may be loaded from a non-transitory computer-readable storage medium independent of the memory 2300, using a drive mechanism (not shown) connected to the node 2000, or via the at least one core network interface 2400, and/or at least one wireless antenna array 2500, etc.

In at least one example embodiment, the communication bus 2200 may enable communication and data transmission to be performed between elements of the node 2000. The bus 2200 may be implemented using a high-speed serial bus, a parallel bus, and/or any other appropriate communication technology. According to at least one example embodiment, the node 2000 may include a plurality of communication buses (not shown), such as an address bus, a data bus, etc.

When the node 2000 operates as a RAN node, for example, a 4G RAN node, a 5G RAN node, etc., the node 2000 may be configured to schedule time domain resource allocations (TDRAs), e.g., orthogonal frequency division multiplexing (OFDM) symbols, physical resource blocks (PRBs), resource elements, etc., for active and/or passive UE devices and/or other nodes (e.g., reader nodes, etc.) connected to the node 2000, but the example embodiments are not limited thereto.

For example, the node 2000 may allocate time-frequency resources of a carrier (e.g., resource blocks with time and frequency dimensions) based on operation on the time domain (e.g., time division duplexing) and/or the frequency domain (e.g., frequency division duplexing). In the time domain context, the node 2000 will allocate a carrier (or subbands of the carrier) to one or more UEs (e.g., active UE devices, etc.) and/or other nodes (e.g., reader nodes 121A, 121B, 131, 141, etc.) connected to the node 2000 during designated upload (e.g., uplink (UL)) time periods and designated download (e.g., downlink (DL)) time periods, or during designated special (S) time periods which may be used for UL and/or DL, but the example embodiments are not limited thereto.

When there are multiple UEs and/or other nodes connected to the node 2000, the carrier is shared in time such that each UE and/or other node is scheduled by the node 2000, and the node 2000 allocates each UE and/or other node with their own uplink time and/or downlink time. In the frequency domain context and/or when performing spatial domain multiplexing of UEs and/or other nodes (e.g., MU MIMO, etc.), the node 2000 will allocate separate frequency subbands of the carrier to UEs and/or other nodes simultaneously served by the node 2000, for uplink and/or downlink transmissions. Data transmission between the UE and/or other nodes with the node 2000 may occur on a radio frame basis in both the time domain and frequency domain contexts. The minimum resource unit for allocation and/or assignment by the node 2000 to a particular UE device and/or particular other node corresponds to a specific downlink/uplink time interval (e.g., one OFDM symbol, one slot, one minislot, one subframe, etc.) and/or a specific downlink/uplink resource block (e.g., twelve adjacent subcarriers, a frequency subband, etc.).

For the sake of clarity and consistency, the example embodiments will be described as using the time domain, but the example embodiments are not limited thereto.

Additionally, the node 2000 may transmit scheduling information via physical downlink common channel (PDCCH) information to the one or more UE devices and/or other nodes located within the cell servicing area of the node 2000, which may configure the one or more UE devices and/or other nodes to transmit (e.g., UL transmissions via physical uplink control channel (PUCCH) information and/or physical uplink shared channel information (PUSCH), etc.) and/or receive (e.g., DL transmissions via PDCCH and/or physical downlink shared channel information (PDSCH), etc.) data packets to and/or from the node 2000. For example, the reader nodes 121A, 121B, 131, 141, etc., may monitor the PDCCH during an ON period of a configured duty cycle (e.g., a default duty cycle, network configured duty cycle, etc.), etc., but the example embodiments are not limited thereto. Additionally, the node 2000 may transmit control messages to the UE device using downlink control information (DCI) messages via physical (PHY) layer signaling, medium access control (MAC) layer control element (CE) signaling, radio resource control (RRC) signaling, etc., but the example embodiments are not limited thereto. Further, the node 2000 may transmit random access configuration information to allow the reader nodes 121A, 121B, 131, 141, etc., to request an uplink allocation from the node 2000, etc. According to at least one example embodiment, the random access configuration information may be physical random access channel (PRACH) configuration, but the example embodiments are not limited thereto.

According to some example embodiments, when the node 2000 operates as a reader node, e.g., reader nodes 121A, 121B, 131, and/or 141, etc., the node 2000 may act as a relay node and/or intermediary node (e.g., an integrated access and backhaul (IAB) node) between the EH UE devices 122, 132, 142, 143, 144, etc., and the RAN node 110 and/or core network 100, etc. According to some example embodiments, the node 2000 may be located in a location proximate to one or more EH UE device and may receive data transmitted by the EH UE device and forward and/or relay the data to the RAN node 110, etc., but is not limited thereto. In other words, the RAN node 110 may associate and/or assign the node 2000 with at least one EH UE device based on a determined and/or calculated distance between the node 2000 and the at least one EH UE device (e.g., the node 2000 may be the closest reader node to the EH UE device out of the plurality of reader nodes and RAN nodes, etc.), but the example embodiments are not limited thereto. For example, the node 2000 may be located in a desired geographical area associated with one or more EH UE devices, e.g., locations 120 or 130 of FIG. 1, etc., and may be assigned by (and/or associated by) the RAN node 110 to receive the data from the EH UE devices (e.g., EH UE devices 122 or 132, etc.) located within the boundaries and/or associated with the desired geographical area, etc., but the example embodiments are not limited thereto. As another example, the RAN node 110 may receive location information related to the node 2000, e.g., from a location sensor, such as GPS receiver, etc., approximate location information, such as angle of arrival (AOA) measurements, observed time difference of arrival (OTDOA), uplink time difference of arrival (UL-TDOA), round trip time (RTT), etc. Moreover, according to some example embodiments, particularly with regards to static RAN nodes and/or reader nodes, the core network 100 the location of each of the RAN nodes and/or reader nodes may be known to the network and/or may be stored in a location database indexed based on an identifier associated with each of the RAN nodes and/or reader nodes, etc.

Additionally, according to some example embodiments, the RAN node 110 may assign and/or associate the node 2000 to at least one EH UE device based on at least one measured signal quality metric between the node 2000 and the EH UE device, e.g., signal interference to noise ratio (SINR), etc., but the example embodiments are not limited thereto. For example, the RAN node 110 may assign the node 2000 to at least one EH UE device in response to the node 2000 having the lowest SINR value out of the plurality of reader nodes and RAN node 110, etc., but the example embodiments are not limited thereto, and for example, the RAN node 110 may assign and/or associate the node 2000 to one or more EH UE devices based on a combination of distance and signal quality, etc. According to at least one example embodiment, the node 2000 may transmit a signal (e.g., a discovery signal, etc.) that is received and measured by one or more EH UE devices, or in other words, the EH UE devices may measure the SINR and/or other signal quality metrics based on and/or using the received signal, etc. The node 2000 may transmit the discovery signal on a periodic basis and/or may transmit the discovery signal on a dynamic basis (e.g., at the instruction and/or control of the RAN node 110 and/or the core network 100, etc.). The EH UE device(s) may then transmit measurement reports (e.g., including the SINR and/or other signal quality metric, etc., information) to the RAN node 110 as part of an association request message, and the RAN node 110 may determine the associated reader node and/or assign the reader node based on the measurements.

Additionally, according to some example embodiments, when the node 2000 is a reader node, the node 2000 may be a stationary reader node, such as a secondary RAN node, a base station, an access point, etc., connected to the wireless network. Further, according to some example embodiments, the node 2000 may be a mobile reader node, such as a UE device capable of operating on the RAT, such as a smartphone, a vehicle, an aerial vehicle, a UAV, etc., but the example embodiments are not limited thereto.

When the node 2000 is operating as either a RAN node and/or a reader node, the node 2000 may also include at least one core network interface 2400, and/or at least one wireless antenna array 2500, etc. The at least one wireless antenna array 2500 may include an associated array of radio units (not shown) and may be used to transmit the wireless signals in accordance with a radio access technology, such as 4G LTE wireless signals, 5G NR wireless signals, etc., to at least one EH UE device, e.g., EH UE devices 122, 132, 142, 143, 144, etc., at least one active EH UE device (not shown), at least one non-EH UE device, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The node 2000 may communicate with a core network (e.g., backend network, backhaul network, backbone network, Data Network, etc.) of the wireless communication network via a core network interface 2400. The core network interface 2400 may be a wired and/or wireless network interface and may enable the node 2000 to communicate and/or transmit data to and from to network devices on the backend network, such as a core network gateway (not shown), a Data Network (e.g., Data Network 105), such as the Internet, intranets, wide area networks, telephone networks, VoIP networks, etc.

While FIG. 2 depicts an example embodiment of a node 2000, the RAN node and/or reader node are not limited thereto, and may include additional and/or alternative architectures that may be suitable for the purposes demonstrated. For example, the functionality of the node 2000 may be divided among a plurality of physical, logical, and/or virtual network elements, such as a centralized unit (CU), a distributed unit (DU), a remote radio head (RRH), and/or a remote radio unit (RRU), etc. Additionally, the node 2000 may operate in standalone (SA) mode and/or non-standalone (NSA) mode using interfaces (not shown) such as X2, Xn, etc., between the node 2000 and other RAN nodes and/or reader nodes of the wireless network, interfaces, such as S1, NG, etc., between the node 2000 and the core network (e.g., core network 100), interfaces between network functions of the node 2000 operating in a distributed and/or virtual RAN mode (not shown), such as F1, E1, etc., and/or interfaces between the physical layer (e.g., a baseband unit, etc.) and the radio layer (e.g., a RRH, core network interface 2400, etc.) (not shown), such as CPRI, eCPRI, etc., but the example embodiments are not limited thereto.

Figure 3:
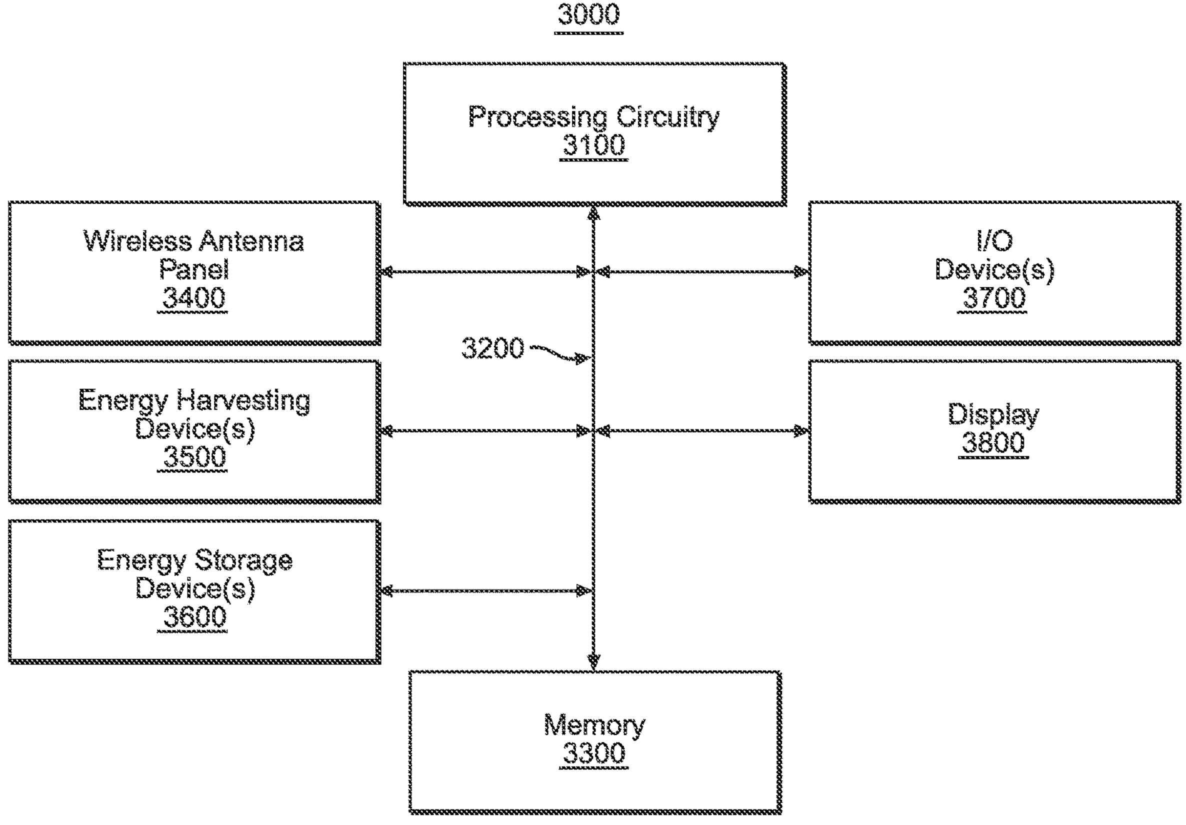
FIG. 3 illustrates a block diagram of an example EH UE device according to at least one example embodiment.

FIG. 3 illustrates a block diagram of an example EH UE device according to at least one example embodiment. The example EH UE device 3000 of FIG. 3 may correspond to one or more of the EH UE devices 122, 132, 142, 143, 144, etc., of FIG. 1, but the example embodiments are not limited thereto, and the EH UE devices may employ alternative architectures, etc.

Referring to FIG. 3, a EH UE device 3000 (which may also be referred to as an ambient or passive IoT device, etc.) may include processing circuitry, such as at least one processor 3100, at least one communication bus 3200, a memory 3300, a plurality of wireless antennas and/or wireless antenna panels 3400, at least one input/output (I/O) device 3700 (e.g., a keyboard, a touchscreen, a mouse, a microphone, a camera, a speaker, etc.), and/or a display panel 3800 (e.g., a monitor, a touchscreen, etc.), but the example embodiments are not limited thereto. According to some example embodiments, the EH UE device 3000 may include a greater or lesser number of constituent components, and for example, the EH UE device 3000 may also include at least one energy harvesting circuitry and/or device 3500, such as one or more solar cells/panels, wind turbines, water turbines, heat pumps, geothermal heat pumps, kinetic energy harvesting devices and/or vibration harvesting devices, radio frequency (RF) harvesting devices, etc., and/or at least one energy storage device (e.g., a battery, a capacitor, etc.), but the example embodiments are not limited thereto. For example, in at least one example embodiment, the energy storage device may be omitted, and the energy collected by the energy harvesting circuitry 3500 may be used to directly power the EH UE device 3000, etc.

According to some example embodiments, the EH UE device 3000 may include at least one RF harvesting circuitry capable of collecting energy from ambient RF signals, e.g., RF signals transmitted from sources which do not use the same RAT as the EH UE device 3000. According to at least one example embodiment, assuming that the EH UE device 3000 is configured to operate according to the 5G NR standard, the EH UE device 3000 may collect energy from ambient RF signals from television broadcast towers, radio broadcast towers, satellites, WiFi access points, Bluetooth access points, etc., but the example embodiments are not limited thereto. Additionally, the EH UE device 3000 may further include one or more proximity sensors (e.g., an infra-red proximity sensor, a capacitive proximity sensor, etc.), one or more location sensors (e.g., GPS, GLONASS, Beidou, Galileo, etc.), other sensors (e.g., thermometers, humidity sensors, pressure sensors, motion sensors, accelerometers, etc.), actuators, a single wireless antenna and/or a single wireless antenna panel, etc. Additionally, the display panel 3800, and/or I/O device 3700, etc., of EH UE device 3000 may be optional.

In at least one example embodiment, the processing circuitry may include at least one processor (and/or processor cores, distributed processors, networked processors, etc.), such as the at least one processor 3100, which may be configured to control one or more elements of the EH UE device 3000, and thereby cause the EH UE device 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire EH UE device 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the EH UE device 3000, such as the methods discussed in connection with FIGS. 4 to 7, etc. Such software elements may be loaded from a non-transitory computer-readable storage medium independent of the memory 3300, using a drive mechanism (not shown) connected to the EH UE device 3000, or via the wireless antenna 3400, etc. Additionally, the memory 3300 may store network configuration information, such as system information, resource block scheduling, etc., for communicating with at least one RAN node, e.g., RAN node 110, etc., and/or at least one reader node, e.g., reader nodes 121A, 121B, 131, and/or 141, etc., accessing a wireless network, etc., but the example embodiments are not limited thereto. According to some example embodiments, the memory 3300 may also store attachment information (e.g., random access configuration information, additional network configuration information, EH UE device attachment information, etc.), such as network information associated with and/or corresponding to at least one assigned reader node (e.g., an identifier associated with the reader node, etc.), a configured (e.g., set, desired, and/or required, etc.) timer associated with the assigned reader node, at least one stored energy or energy level thresholds (e.g., current energy level thresholds), etc., but the example embodiments are not limited thereto. The attachment information will be discussed in greater detail in connection with FIG. 4.

In at least one example embodiment, the at least one communication bus 3200 may enable communication and data transmission/reception to be performed between elements of the EH UE device 3000, and/or monitor the status of the elements of the EH UE device 3000 (e.g., monitor the current energy storage level of the energy storage device 3600, monitor the current amount of energy being collected, monitor whether the energy harvesting device 3500 is currently active (e.g., harvesting and/or collecting energy) or currently inactive (e.g., not collecting energy), etc. The bus 3200 may be implemented using a high-speed serial bus, a parallel bus, and/or any other appropriate communication technology. According to at least one example embodiment, the EH UE device 3000 may include a plurality of communication buses (not shown), such as an address bus, a data bus, etc.

The EH UE device 3000 may also include at least one wireless antenna panel 3400, but is not limited thereto. The at least one wireless antenna panel 3400 may include at least one associated radio unit (not shown) and may be used to transmit wireless signals in accordance with at least one desired radio access technology, such as 4G LTE, 5G NR, Wi-Fi, etc. Additionally, the at least one wireless antenna panel 3400 may be configured to transmit and/or receive data communications, etc., but the example embodiments are not limited thereto. The at least one wireless antenna panel 3400 may be located at the same or different physical locations on the body of the EH UE device 3000, may have the same or different orientations, may operate in the same or different frequency ranges, may operate in accordance with the same or different radio access technology, etc. According to some example embodiments, the at least one wireless antenna panel 3400 may be a single antenna, or may be a plurality of antennas, etc. Additionally, the at least one wireless antenna panel 3400 may be used to collect energy from ambient RF signals, etc.

While FIG. 3 depicts an example embodiment of an EH UE device 3000, the EH UE device is not limited thereto, and may include additional and/or alternative architectures that may be suitable for the purposes demonstrated.

Figures 4, 5:
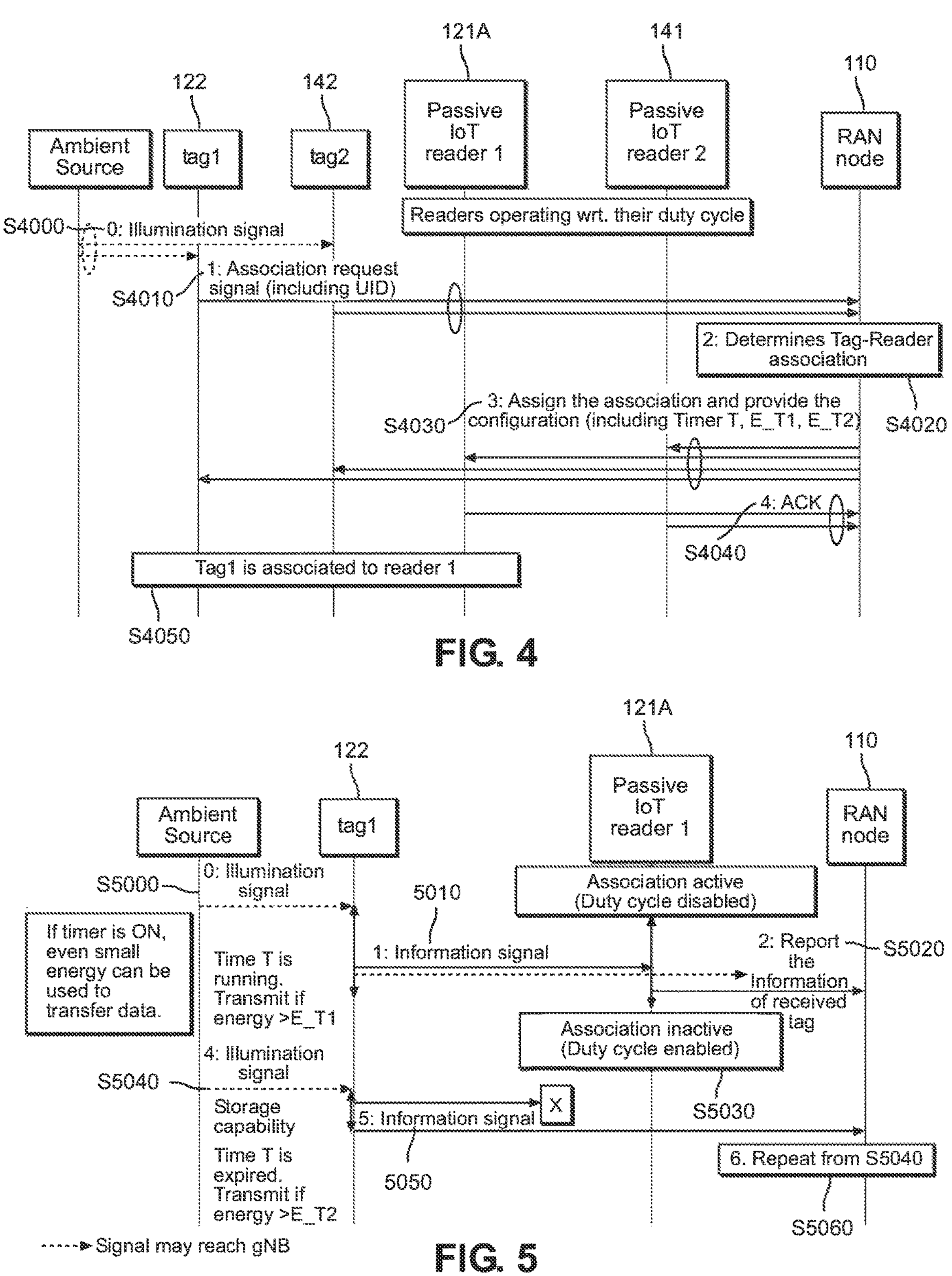
FIG. 4 is a first example transmission flow diagram illustrating an attachment method between at least one EH UE device and at least one reader node according to at least one example embodiment.
FIG. 5 is a second example transmission flow diagram illustrating communication between a EH UE device attached to a reader node according to at least one example embodiment.

FIG. 4 is a first example transmission flow diagram illustrating an attachment method between at least one EH UE device and at least one reader node according to at least one example embodiment, but the example embodiments are not limited thereto.

As shown in FIG. 4, according to at least one example embodiment, a wireless network may include at least a first EH UE device, e.g., EH UE device 122 of FIG. 1, a second EH UE device, e.g., EH UE device 142 of FIG. 1, a first reader node, e.g., reader node 121A of FIG. 1, a second reader node, e.g., reader node 141 of FIG. 1, and at least one RAN node, e.g., RAN node 110 of FIG. 1, but the example embodiments are not limited thereto, and for example, there may be a greater or lesser number of constituent elements in the wireless network of FIG. 4. As shown in FIG. 1, EH UE device 122 and reader node 121A may both be located in a same geographical area 120, and EH UE device 142 and reader node 141 may be unassigned and/or unassociated, but the example embodiments are not limited thereto.

According to at least one example embodiment, in operation S4000, the EH UE devices 122 and/or 142 may collect, harvest, and/or store energy from an energy source, e.g., from ambient RF signals, from sunlight, from wind, etc. Additionally, the first and second reader nodes 121A and 141 may be operating in accordance with a desired and/or configured duty cycle, the duty cycle including a desired first period wherein the reader nodes 121A and 141 are "on" and/or monitoring for transmission of data, receiving data, etc., and a desired second period wherein the reader nodes 121A and 141 are "off" and/or are powered off, operating in a low power mode, and/or transmitting data to the RAN node 110, etc. In operation S4010, in response to the EH UE devices 122 and 142 having data to transmit to the wireless network and collecting at least a desired and/or required amount of energy (e.g., meeting and/or exceeding a desired threshold amount of energy for transmitting data to the RAN node, etc.), the EH UE devices 122 and 142 may transmit and/or broadcast an association request message (e.g., an attachment request message, etc.) to the RAN node 110, wherein the association request message may include information corresponding to the transmitting EH UE device, such as an identifier associated with and/or corresponding to the respective EH UE device, location information corresponding to the respective EH UE device, current energy levels stored by the EH UE device, etc., but the example embodiments are not limited thereto.

According to at least one example embodiment, the EH UE devices 122 and/or 142 may also include SINR information and/or other signal quality metric information to the association request message, the SINR and/or other signal quality metric measured using and/or based on a signal (e.g., a discovery signal) transmitted by and/or broadcast by one or more reader nodes, etc. For example, the EH UE devices 122 and 142 may each receive discovery signals broadcast by the reader nodes 121A and 141, may measure SINR information and/or other signal quality metric information using the received discovery signals, and then include the measured SINR and/or other signal quality metric information associated with reader nodes 121A and 141 with the association request message, etc. However, the example embodiments are not limited thereto, and for example, the EH UE devices 122 and 142 may transmit the SINR and/or other signal quality metric information to the RAN node 110 as a measurement report separate from the association request message, etc.

Additionally, the desired threshold amount may correspond to at least the amount of energy desired and/or required for each of the EH UE devices 122 and 142 to transmit the association request message to the RAN node 110 and may be configured based on transmission signal quality metrics, e.g., SINR, etc., and/or distance between the EH UE devices and the RAN node 110, etc. Further, according to some example embodiments, the desired threshold amount may differ for each EH UE device based on the amount of energy desired and/or required to transmit a message to the RAN node 110, etc. Moreover, the desired threshold amount may include a buffer amount of energy to allow the EH UE device to transmit one or more additional messages to the RAN node 110 and/or reader nodes, etc., but the example embodiments are not limited thereto.

In response to the received association request messages, in operation S4020, the RAN node 110 may determine reader node associations with the EH UE devices 122 and 142, etc. For example, the RAN node 110 may analyze the identifier of each of the EH UE devices included in the association request messages to determine whether the EH UE device is in a set, configured, and/or desired geographical area (e.g., geographical area 120, etc.) to determine at least one candidate reader node for assignment to the EH UE device (e.g., at least one reader node located in the same geographical area as the EH UE device, etc.), but the example embodiments are not limited thereto. In at least one example embodiment, the RAN node 110 may determine a location (e.g., actual location or an approximate location) of the EH UE device based on the identifier of the EH UE device and/or location information of the EH UE device transmitted in the association request message and may then determine one or more candidate reader nodes to potentially assign to the EH UE device 120 based on a determined distance between the location (e.g., approximate, etc.) of the EH UE device and the location of each of the reader nodes of the wireless network, but the example embodiments are not limited thereto. In other example embodiments, the RAN node 110 may determine at least one candidate reader node for assignment to the EH UE device based on SINR and/or other signal quality metric information between the EH UE device and the plurality of reader nodes of the wireless network. For example, the SINR information associated with and/or corresponding to each of the plurality of reader nodes may be measured by the EH UE device in response to receiving a discovery signal from each of the plurality of reader nodes, etc. Additionally, the SINR information may be measured by each of the plurality of reader nodes in response to the transmission of the association request message by the EH UE device, and the plurality of reader nodes may transmit the measured SINR information to the RAN node 110, etc.

Following the determination of candidate reader nodes to assign to and/or associate with the EH UE device, the RAN node 110 may select the candidate reader node of the plurality of candidate reader nodes with the smallest distance to the EH UE device, but the example embodiments are not limited thereto. Additionally, according to some example embodiments, the RAN node 110 may select the candidate reader node from the plurality of candidate reader nodes to assign to and/or associate with the EH UE device based on the measured signal quality metric (e.g., having the highest signal quality), etc.

In at least one example embodiment, assuming the RAN node 110 assigns reader node 121A to EH UE device 122 and reader node 141 to EH UE device 142, in operation S4030, the RAN node 110 transmits an association response message to the EH UE devices and/or the associated reader nodes. In at least one example embodiment, the association response message includes information allowing the EH UE devices 122 and 142 to attach to the assigned reader nodes 121A and 141, respectively, including for example, random access configuration information corresponding to the assigned reader nodes, the identifiers associated with the assigned reader nodes, authentication information for authenticating the EH UE device with the reader node, network address information corresponding to the assigned reader nodes, attachment timer information, and/or at least one stored energy threshold or energy level threshold, etc., but the example embodiments are not limited thereto. Additionally, the RAN node 110 may transmit a separate association response message to the associated reader nodes which may further include identifier(s) associated with each of the assigned EH UE device(s), the network address information corresponding to the assigned EH UE device(s), the attachment timer information, etc., but the example embodiments are not limited thereto.

According to some example embodiments, the attachment timer information may include a configured (and/or set, desired, required, etc.) timer period (and/or a set, configured, desired, and/or required time period) T during which the EH UE devices may transmit and/or broadcast data to the associated reader node(s), etc. Additionally, the at least one stored energy threshold may include, for example, a first stored energy threshold associated with data transmission between the EH UE device and the assigned reader node(s), and/or a second stored energy threshold associated with data transmission between the EH UE device and the RAN node 110, etc., the second stored energy threshold being greater than the first stored energy threshold because the amount of transmitting power desired and/or required for transmitting data from the EH UE device to the assigned reader node(s) is less than the amount of transmitting power desired and/or required for transmitting data to the RAN node, but the example embodiments are not limited thereto. In the event that multiple reader nodes have been assigned to the EH UE device, a plurality of first stored energy thresholds may be provided to the EH UE device, wherein each of the plurality of first stored energy thresholds is configured based on the amount of transmitting power desired and/or required for transmitting data to the respective reader node, etc. Additionally, according to at least one example embodiment, the EH UE device may be provided with a single first stored energy threshold and the first stored energy thresholds may be configured based on the amount of transmitting power desired and/or required for transmitting data to the reader node of the plurality of assigned reader nodes which is the furthest away from the EH UE device and/or has the lowest SINR with the EH UE device (or in other words requires the most transmitting power, etc.), but the example embodiments are not limited thereto.

According to some example embodiments, the desired timer period, the first stored energy threshold, and/or the second stored energy threshold may differ between pairs of EH UE devices and associated reader nodes, and more specifically, may depend on transmission requirements between the respective EH UE device and the associated reader nodes, etc., and may be assigned by the RAN node 110 and/or the core network 100, etc., but the example embodiments are not limited thereto. The attachment information will be discussed in greater detail in connection with FIGS. 5 to 7.

In operation S4040, the reader nodes 121A and 141 may transmit an acknowledgement response to the RAN node 110 indicating that the reader nodes 121A and 141 have received the attachment information from the RAN node 110. Additionally, in response to the attachment information received from the RAN node 110, in operation S4050, the reader nodes 121A and 141 may stop operating in accordance with their configured duty cycles, and may begin operation based on the attachment information, including beginning monitoring for data transmission from the EH UE devices 122 and 142, respectively using the desired timer period T. While FIG. 4 assumes that a single EH UE device is associated with a single reader node, the example embodiments are not limited thereto, and for example, a single EH UE device may be associated with a plurality of reader nodes (e.g., EH UE device 122 may be associated with reader nodes 121A and 121B, etc.) and/or a single reader node may be associated with a plurality of EH UE devices (e.g., reader node 131 may be associated with EH UE devices 132 and 133, etc.).

FIG. 5 is a second example transmission flow diagram illustrating communication between a EH UE device attached to a reader node according to at least one example embodiment. For the sake of clarity and brevity, FIG. 5 illustrates a single EH UE device-reader node pair, e.g., EH UE device 122 and assigned reader node pair 121A, the example embodiments are not limited thereto, and for example, two or more EH UE device-reader node pairs may communicate concurrently, such as EH UE device 142 and reader node 141, etc.

Referring now to FIG. 5, in operation S5000, following the association of the EH UE device 122 and the reader node 121A as shown in the at least one example embodiment of FIG. 4, the EH UE device 122 and the reader node 121A may both begin counting down a desired (e.g., set, configured, required, etc.) timer period T based on the attachment timer information included in the association message transmitted by the RAN node 110. During the desired timer period T, the reader node 121A may discontinue operating in accordance with its configured duty cycle, and may instead begin monitoring for data transmission from the associated EH UE device 122. Additionally, the EH UE device 122 may continue to collect, harvest, and/or store ambient energy, and once the stored energy and/or current collected energy level meets and/or exceeds the first stored energy threshold (e.g., the desired energy threshold associated with transmission between the EH UE device and the assigned reader node), and assuming that the desired timer period T has not expired, in operation S5010, the EH UE device 122 will transmit its data to the reader node 121A. If the stored energy and/or current collected energy level continues to meet and/or exceed the first stored energy threshold and the desired timer period T has not expired, the EH UE device 122 may continue to transmit data to the reader node 121A. However, once the desired timer period T expires, in operation S5020, the reader node 121A transmits and/or forwards the data received from the EH UE device 122 to the RAN node 110, and resumes its configured duty cycle.

In operation S5040, the EH UE device 122 may continue to collect, harvest, and/or store ambient energy, and once the stored energy and/or current collected energy level meets and/or exceeds the second stored energy threshold (e.g., the desired energy threshold associated with transmission between the EH UE device and the assigned reader node), the EH UE device 122 may transmit a new association request message to the RAN node 110, etc. In operation S5060, the RAN node 110 may repeat the operations S4020 to S4040 of FIG. 4, etc., but the example embodiments are not limited thereto.

Figure 6:
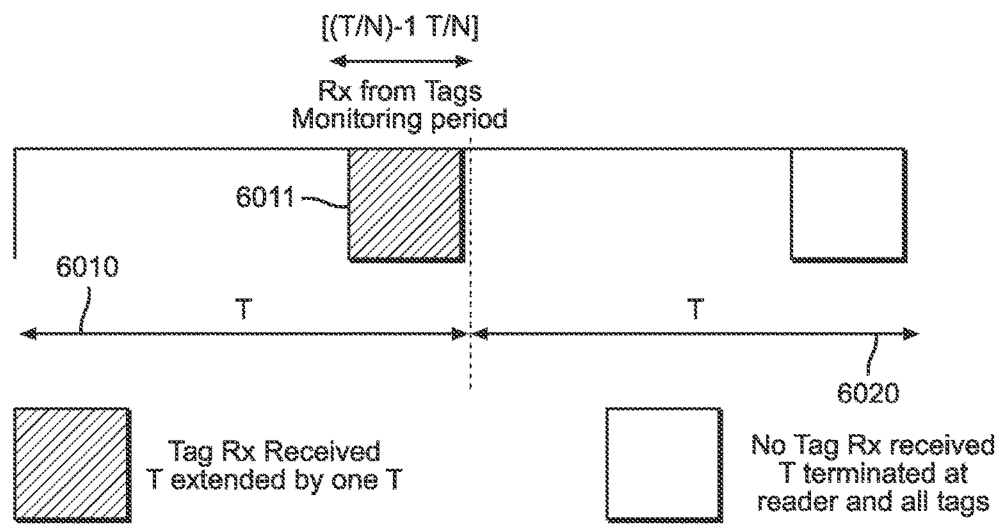
FIG. 6 illustrates an example extended monitoring period according to at least one example embodiment.

FIG. 6 illustrates an example extended monitoring period according to at least one example embodiment. According to at least one alternate example embodiment, the desired timer period T may be extended by the reader node, e.g., reader node 121A, etc., based on a time at which data was received from the EH UE device 122, etc. More specifically, if the reader node 121A receives new data (e.g., 6011) from the EH UE device 122 within a desired (e.g., set, configured, required, etc.) sub-time period of the desired timer period T (e.g., 6010), the reader node 121A may extend the desired timer period T for an additional amount of time (e.g., 6020), or in other words the reader node 121A may extend its monitoring time period for an additional amount of time, etc. For example, if the reader node 121A receives new data within the last [(T/N)−1, T/N], wherein T is the desired timer period, and Nis any integer less than T, the reader node 121A may extend its monitoring time period, but the example embodiments are not limited thereto. According to at least one example embodiment, the reader node 121A may extend its monitoring time period by an additional time period T, etc., but the example embodiments are not limited thereto, and any other value may be used for the additional time period. The reader node 121A may also transmit a monitoring period extension message to the associated EH UE device indicating that the monitoring period has been extended by a desired period of time, etc., but the example embodiments are not limited thereto. If no new data is received within the last [(T/N)−1, T/N] of the extended time period, the reader node 121A transmits and/or forwards the received data to the RAN node 110 and resumes operation based on its configured duty cycle, etc.

Figure 7:
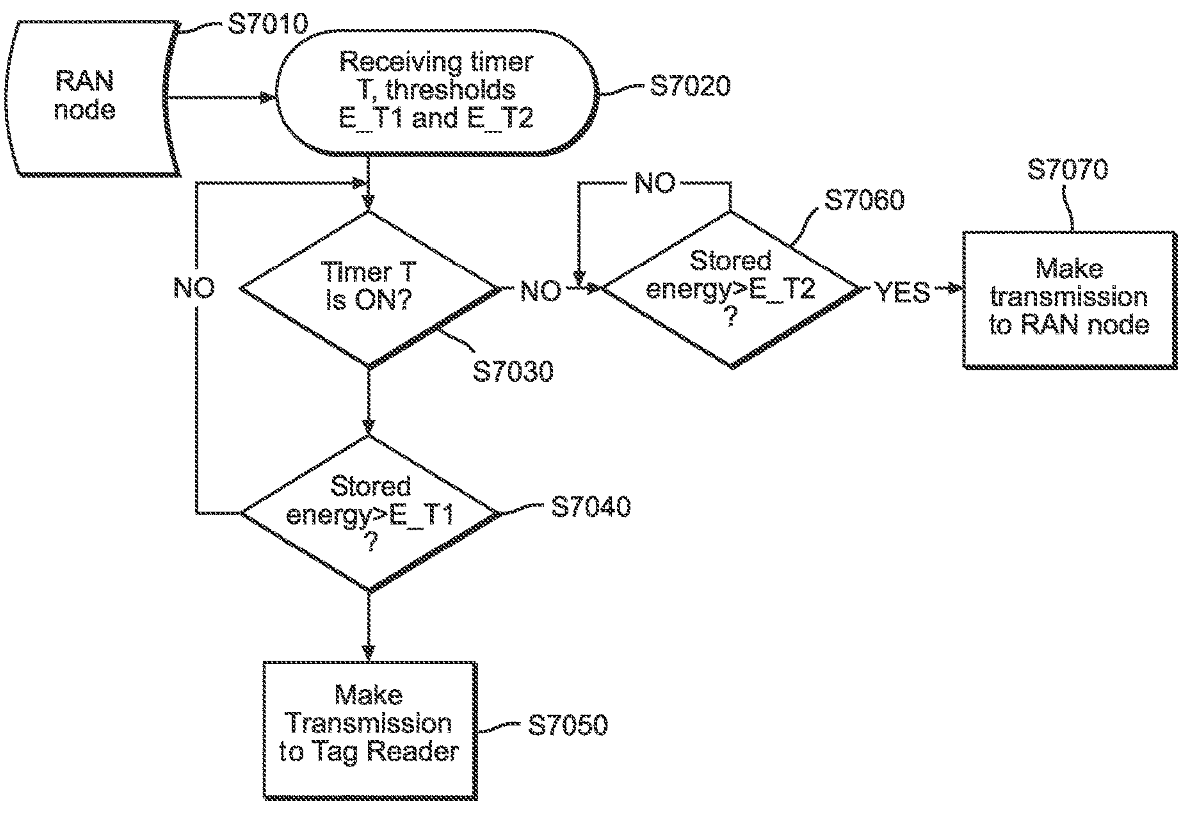
FIG. 7 is a flowchart illustrating a method of operating an EH UE device according to at least one example embodiment.

FIG. 7 is a flowchart illustrating a method of operating an EH UE device according to at least one example embodiment.

According to at least one example embodiment, in operation S7010, the EH UE device, such as EH UE device 122, may transmit an association request message to the RAN node 110 indicating that the EH UE device 122 has data to transmit to the wireless network, and optionally, SINR measurement reports corresponding to at least one reader node, etc. In operation S7020, the EH UE device 122 receives the attachment information from the RAN node 110, the attachment information including the desired timer period T, the first stored energy threshold, and/or the second stored energy threshold, etc. In operation S7030, the EH UE device 122 determines whether the desired timer period T is still valid (e.g., has not expired). If the desired timer period T has not expired (Yes), in operation S7040, the EH UE device 122 then determines whether the amount of stored energy and/or current energy level of the collected energy in the EH UE device 122 exceeds the first stored energy threshold. If yes, in operation S7050, the EH UE device 122 transmits data to the assigned reader node 121A, and the method returns to operation S7030.

Returning to operation S7040, if the EH UE device 122's stored energy and/or current energy level of the collected energy is less than the first stored energy threshold, in operation S7040, the EH UE device 122 continues to collect energy and returns to operation S7030.

Returning to operation S7030, if the desired timer period T has expired (e.g., No), in operation S7060, the EH UE device 122 determines whether the EH UE device's stored energy and/or current energy level of the collected energy exceeds the second stored energy threshold. If the result is "No", the EH UE device 122 continues to collect energy and returns to operation S7030. If the result is "Yes" the stored energy and/or current energy level of the collected energy exceeds the second stored energy threshold, in operation S7070, the EH UE device 122 makes an association request message transmission to the RAN node 110, etc., and the method returns to operation S7020.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A radio access network (RAN) node comprising:
a memory storing computer readable instructions; and
processing circuitry configured to execute the computer readable instructions to cause the RAN node to:
receive an association request message transmitted by an energy-harvesting (EH) user equipment (UE) device based on an energy level of the EH UE device;
assign a reader node from a plurality of reader nodes to the EH UE device based on the association request message, wherein the plurality of reader nodes are operating in accordance with a configured duty cycle, the duty cycle including a desired first period wherein the plurality of reader nodes are "on" and monitoring for transmission of data, receiving data and a desired second period wherein the plurality of reader nodes are "off" and are powered off. operating in a low power mode, and transmitting data to the RAN node;
transmit an association response message to the EH UE device and the assigned reader node, the association response message including attachment information associated with the EH UE device and the assigned reader node; and
receive an attachment acknowledgement message from the assigned reader node in response to the association response message.

2. The radio access network node of claim 1, wherein
the association request message further includes signal to interference and noise ratio (SINR) information of at least one reader node of the plurality of reader nodes measured by the EH UE device in response to a signal transmitted by the at least one reader node; and
the RAN node is further caused to assign the reader node by,
selecting the assigned reader node from the plurality of reader nodes based on the received SINR information.

3. The radio access network node of claim 1, wherein
the association request message includes an identifier associated with the EH UE device; and
the RAN node is further caused to assign the reader node to the EH UE device by,
selecting the assigned reader node from the plurality of reader nodes based on the identifier associated with the EH UE device.

4. The radio access network node of claim 3, wherein
the RAN node is further caused to assign the reader node by,
determining an approximate location of the EH UE device based on the identifier associated with the EH UE device, and
selecting the assigned reader node from the plurality of reader nodes based on a determined distance between the approximate location of the EH UE device and locations of the plurality of reader nodes.

5. The radio access network node of claim 1, wherein the RAN node is further caused to:
receive a message from each of the plurality of reader nodes in response to the transmitted association request message, the messages including SINR information between the EH UE device and the respective reader node; and
the RAN node is further caused to assign the reader node by,
selecting the assigned reader node from the plurality of reader nodes based on the received SINR information measured between the EH UE device and the plurality of reader nodes.

6. The radio access network node of claim 1, wherein the attachment information includes at least one of:
random access configuration associated with the assigned reader node, an identifier associated with the assigned reader node, the identifier associated with the EH UE device, or any combinations thereof.

7. The radio access network node of claim 1, wherein the attachment information includes attachment timer information, a first stored energy threshold, and a second stored energy threshold, the first stored energy threshold associated with transmission between the EH UE device and the assigned reader node, and the second stored energy threshold associated with transmission between the EH UE device and the RAN node.

8. The radio access network node of claim 7 wherein the RAN node is further caused to:
receive data transmitted by the EH UE device in response to expiration of a configured time period corresponding to the attachment timer information and the energy level of the EH UE device exceeding the second stored energy threshold;
assign a new reader node from the plurality of reader nodes to the EH UE device in response to the received data; and
transmit a new association response message to the EH UE device and the new assigned reader node, the new association response message including new attachment information associated with the EH UE device and the new assigned reader node.

9. An energy-harvesting (EH) user equipment (UE) device comprising:
at least one energy harvesting circuitry configured to collect energy;
a memory storing computer readable instructions; and
processing circuitry configured to execute the computer readable instructions to cause the device to:
transmit an association request message to a radio access network (RAN) node based on an energy level of the collected energy;
receive an association response message from the RAN node, the association response message including attachment information corresponding to a reader node assigned to the EH UE device from a plurality of reader nodes, wherein the plurality of reader nodes are operating in accordance with a configured duty cycle, the duty cycle including a desired first period wherein the plurality of reader nodes are "on" and monitoring for transmission of data, receiving data and a desired second period wherein the plurality of reader nodes are "off" and are powered off, operating in a low power mode, and transmitting data to the RAN node; and
transmit data to the assigned reader node based on the attachment information.

10. The device of claim 9, wherein the device is further caused to:
receive a signal from at least one reader node of the plurality of reader nodes;
measure signal to interference and noise ratio (SINR) information between the at least one reader node and the EH UE device using the received signal; and transmit the association request message to the RAN node, the association request message further including the measured SINR information.

11. The device of claim 9, wherein the reader node is assigned by the RAN node from the plurality of reader nodes based on a determined distance between an approximate location of the EH UE device determined based on an identifier associated with the EH UE device and locations of the plurality of reader nodes.

12. The device of claim 9, wherein the reader node is assigned to the EH UE device by the RAN node from the plurality of reader nodes based on a measured SINR between the EH UE device and the plurality of reader nodes.

13. The device of claim 9, wherein the attachment information includes at least one of:

random access configuration associated with the assigned reader node, an identifier associated with the assigned reader node, the identifier associated with the EH UE device, or any combinations thereof.

14. The device of claim 9, wherein the at least one energy harvesting circuitry is configured to collect the energy from at least one of:

ambient radio frequency energy, kinetic energy, solar energy, thermal energy, or any combinations thereof.

15. A method of operating a radio access network (RAN) node, the method comprising:

receiving an association request message transmitted by an energy-harvesting (EH) user equipment (UE) device based on an energy level of the EH UE device;

assigning a reader node from a plurality of reader nodes to the EH UE device based on the association request message, wherein the plurality of reader nodes are operating in accordance with a configured duty cycle, the duty cycle including a desired first period wherein the plurality of reader nodes are "on" and monitoring for transmission of data, receiving data and a desired second period wherein the plurality of reader nodes are "off"" and are powered off, operating in a low power mode, and transmitting data to the RAN node;

transmitting an association response message to the EH UE device and the assigned reader node, the association response message including attachment information associated with the EH UE device and the assigned reader node; and receiving an attachment acknowledgement message from the assigned reader node in response to the association response message.

16. The method of claim 15, wherein the association request message includes an identifier associated with the EH UE device; and the assigning the reader node further includes, selecting the assigned reader node from the plurality of reader nodes based on the identifier associated with the EH UE device.

17. The method of claim 16 wherein the assigning the reader node further includes:

determining an approximate location of the EH UE device based on the identifier associated with the EH UE device; and selecting the assigned reader node from the plurality of reader nodes based on a determined distance between the approximate location of the EH UE device and locations of the plurality of reader nodes.

18. The method of claim 15, further comprising:

receiving a message from each of the plurality of reader nodes in response to the transmitted association request message, the messages including signal to interference and noise ratio (SINR) information between the EH UE device and the respective reader node; and the assigning the reader node further includes, selecting the assigned reader node from the plurality of reader nodes based on the received SINR information measured between the EH UE device and the plurality of reader nodes.

19. The method of claim 15, wherein the attachment information includes attachment timer information; and the attachment information includes at least one of:

random access configuration associated with the assigned reader node, an identifier associated with the assigned reader node, the identifier associated with the EH UE device, or any combinations thereof.

20. The method of claim 19, further comprising:

receiving data transmitted by the EH UE device in response to expiration of a configured time period corresponding to the attachment timer information;

assigning a new reader node from the plurality of reader nodes to the EH UE device based on the received data; and transmitting a new association response message to the EH UE device and the new assigned reader node, the new association response message including attachment information associated with the EH UE device and the new assigned reader node.

* * * * *